(12) United States Patent
Goldner et al.

(10) Patent No.: US 6,628,400 B2
(45) Date of Patent: Sep. 30, 2003

(54) HIGH SENSITIVITY, HIGH BANDWIDTH ACCELEROMETER WITH FIBER OPTIC SENSING

(75) Inventors: Eric L. Goldner, Valencia, CA (US); Michael J. Tweedy, Simi Valley, CA (US)

(73) Assignee: Litton Systems, Inc., Woodland Hills, CA (US)

(*) Notice: Subject to any disclaimer, the term of this patent is extended or adjusted under 35 U.S.C. 154(b) by 254 days.

(21) Appl. No.: 09/822,051

(22) Filed: Mar. 30, 2001

(65) Prior Publication Data

US 2002/0141681 A1 Oct. 3, 2002

(51) Int. Cl.[7] .............................. G01P 15/00; G01B 9/02
(52) U.S. Cl. .............................. 356/477; 73/514; 73/26
(58) Field of Search .............................. 356/477; 73/514.26, 73/514.27, 488; 250/227.19

(56) References Cited

U.S. PATENT DOCUMENTS 4,994,668 A * 2/1991 Lagakos et al. ........ 250/227.19
6,384,919 B1 * 5/2002 Fersht et al. ................ 356/477

* cited by examiner

Primary Examiner—Kevin Pyo
(74) Attorney, Agent, or Firm—Elliott N. Kramsky

(57) ABSTRACT

An accelerometer of the type in which a disk is mounted upon a vertical post. The accelerometer may be employed as a hydrophone, for example, including a watertight case, and forming a neutrally buoyant structure or may be suitable for hull-mounting. The disk comprises a planar honeycombed structure. A solid, dense ring-like peripheral mass is fixed to the central honeycombed structure to form a composite apparatus. The honeycombed central structure contributes enhanced stiffness without a corresponding increase in weight when compared with disks of solid fabrication while the peripheral concentration of mass increases radius of gyration sufficiently to offset gain diminution due to increased stiffness so that an increase in figure of merit is obtained.

11 Claims, 1 Drawing Sheet

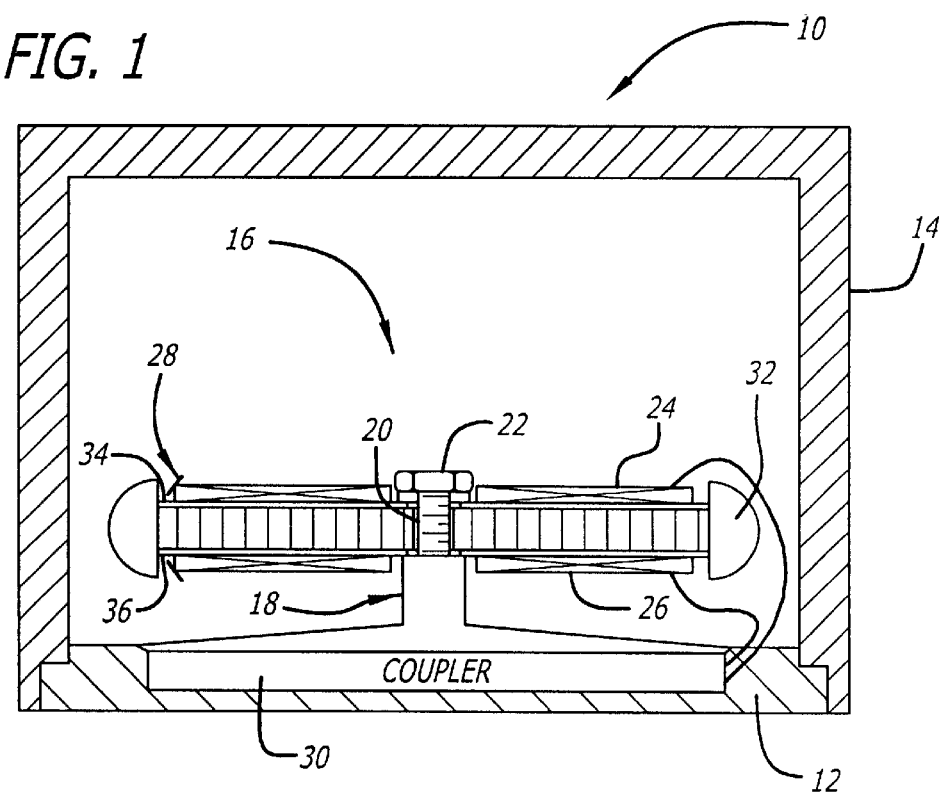
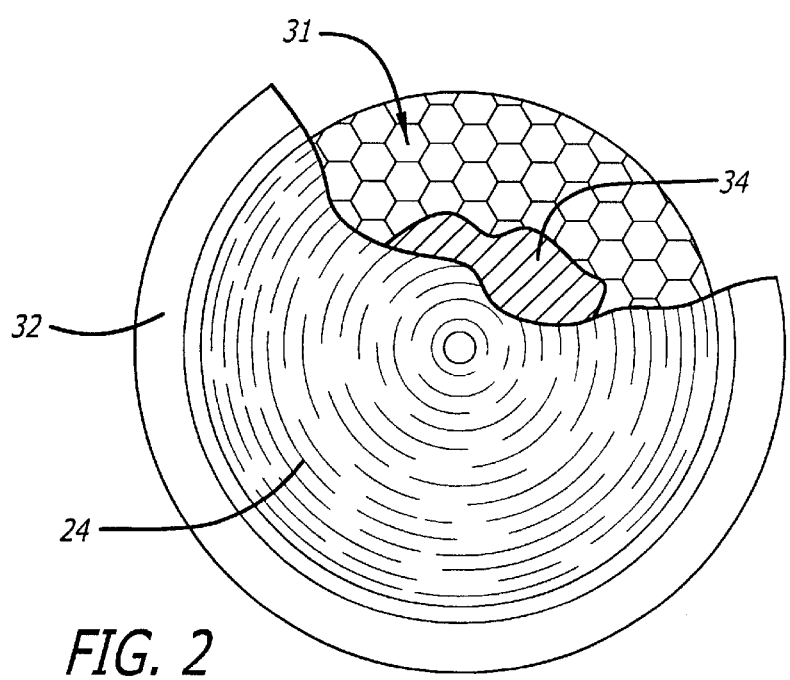

HIGH SENSITIVITY, HIGH BANDWIDTH ACCELEROMETER WITH FIBER OPTIC SENSING

BACKGROUND

The present invention relates to accelerometers that including a fiber optic arrangement for signal detection. More particularly, this invention pertains to such a device that includes a centrally-supported flexural disk.

In the prior art, accelerometers of the above-mentioned type have featured flexural disks of integral design formed of solid metal, plastic or, for example, polycarbonate with various filling materials. Various factors, including material modulus, stiffness and weight are adjusted to vary the resonance and scale factor (degree of bending) of the sensing disk. Coils of optical fiber are fixed to the opposed surfaces of the responsive element. Each coil forms an arm of an interferometer with their relative lengths of the two optical paths varying as a function of the degree of deflection of the element. Devices of this type are taught, for example, by U.S. Pat. No. 5,883,308 of Samuel N. Fersht entitled "Fiber Optic Twist Ring Accelerometer", property of the Assignee herein.

Experience has shown that the well-known tradeoff between bandwidth and gain in a device of the type described above has limited the possibility of increasing the figure of merit (product of bandwidth and gain) in an accelerometer of the above-identified type. Stiffening or softening the solid flexural disk tends to affect bandwidth and gain (or sensitivity) in opposite senses, leaving the important figure of merit measure of the device either static or decreased.

SUMMARY OF THE INVENTION

The preceding and other disadvantages of the prior art are addressed by the present invention that provides, in a first aspect, an accelerometer with fiber optic sensing. Such accelerometer includes a disk having opposed surfaces. The disk is substantially-horizontally supported with a case. A first coil of optical fiber is fixed to the top surface of the disk and a second coil is fixed to the bottom surface of the disk. A substantially-planar honeycomb structure is intermediate the top and bottom surfaces of the disk.

In a second aspect, the invention provides an accelerometer that includes a substantially-planar disk that is horizontally-supported within a case. First and second coils of optical fiber are fixed to the opposed surfaces of the disk that form the legs of an interferometer. The disk includes a central portion and an outer portion with the outer portion being characterized by greater density than the central portion.

In a third aspect, the invention provides a method for increasing the figure of merit of an accelerometer including a centrally-mounted, substantially horizontal disk having opposed top and bottom surfaces within a case. Such method is accomplished by interposing a honeycomb structure between the top and bottom surfaces of the disk.

The foregoing and other features of this invention shall become further apparent from the detailed description that follows. Such description is accompanied by a set of drawing figures. Numerals of the figures, corresponding to those of the written description, point to the features of the invention with like numerals referring to like features throughout both the drawing figures and the written text.

BRIEF DESCRIPTION OF THE DRAWINGS

FIG. 1 is a simplified cross-sectional view of the invention in elevation; and

FIG. 2 is a top planar partially-broken view of the sensing disk of the invention.

DETAILED DESCRIPTION OF THE PREFERRED EMBODIMENT

FIG. 1 is a simplified cross-sectional elevation view of an accelerometer 10 in accordance with the invention. The device is contained within a sealed case comprising a base 12 and cover 14. It will be seen that devices of such general configuration may function, in the alternative, as either an accelerometer for detecting forces exerted upon the case or as a displacement sensor for measuring case movement. The former application is often employed in hydrophones while the latter application is often utilized to make seismic measurements.

When employed as an accelerometer to function as an acoustic hydrophone, the device is often designed for neutral buoyancy for performance reasons so that, when submerged underwater, acoustic signals are not undesirably refracted/reflected when encountering an object of different bulk density than the surrounding medium (e.g. sea water). As such, designs for this important application depend upon adherence to a weight budget.

Whether it operates as an accelerometer or a displacement sensor depends upon the frequency range of interest. Measurements of case acceleration are reliably made for frequencies that lie below the resonant frequency of the device while case displacement is measured above resonance. Accordingly, device design will include adjustment and location of the natural frequency of the device. A relatively high resonant frequency is desirable in a hydrophone, acoustic sensor or other acceleration-detecting device and a relatively low resonant frequency is desirable in a seismic displacement sensor.

A flexural disk 16 is mounted to a centrally located post 18 extending from the base 12. In an accelerometer, the outer edge of the disk 16 is deflected in the same direction as motion of the case (in-phase or with a slight phase lag) while, in a displacement sensor, motion of the disk 16 opposes that of the case (approximately 180° out-of phase).

The flexural disk 16 is centrally supported by a threaded rod that extends upward from the post 18 and is secured by means of a nut 22. The central mounting of the disk 16 subjects it to upward and downward deflection at its periphery in response to environmentally-induced vibration of the external case assembly.

A first coil 24 of optical fiber is fixed to the top surface of the disk 16 and a second coil 26 of optical fiber is fixed to the bottom surface of the disk 16. The coils 24 and 26 form the arms of a Michelson interferometer that also includes the mirrored end 28 of the first coil 24 and a coupler 30 (a laser source and photodetector are not shown). The interferometer might also be of the Mach-Zender type. Each type of interferometer is well-known to those skilled in the art.

FIG. 2 is a partially broken top planar view of the flexural disk 16 of the invention. Referring to FIGS. 1 and 2 in combination, the disk 16 is seen to comprise a honeycombed central structure 31 surrounded by a ring-like mass 32 (preferably of tungsten). The interior of the disk 16 consists of a sheet of (preferably aluminum) honeycomb material rigidly attached to top and bottom planar surfaces 34 and 36 respectively.

In operation, a transducer of the general type of the invention could be deployed in fluid, surface or subsurface environments. Hydrophone applications typically track acoustic signals up to several thousand kHz. As mentioned above, some important hydrophone applications, such as those of towed arrays and hull-mounted planar arrays require a device of designed for neutral bouyancy for performance reasons described above and are subject to a critical weight budget for this reason.

For accelerometer applications, a significant measure of the quality of the sensor is its gain-bandwidth product, commonly called a "figure of merit". Such measure is defined as follows:

$$F = f \times g$$

where:

$F$ = figure of merit;

$f$ = frequency bandwidth of device; and $g$ = gain of device.

In an accelerometer, increases in bandwidth are desirable as they enhance the amount of acoustic spectrum that may be captured while enhanced gain allows one to detect more distant objects, increases the signal-to-noise ratio and thereby minimizes the amount of required filtering. The bandwidth of an accelerometer in accordance with the invention extends from zero to resonance although the reliability of device operation for frequencies near resonance is not optimal.

The stiffness of the disk 16 affects both f and g and, thus, the figure of merit F of the accelerometer. In the present invention, the mass of the disk 16 comprises a two-part arrangement of the honeycomb central structure 31 and the solid outer ring 32. The honeycombed material adds significant stiffness without the corresponding increase in weight that one would obtain in a stiffened disk of solid or integral fabrication. By increasing stiffness, the bandwidth of the accelerometer is enhanced. Unfortunately, increased stiffness, tends to lower the gain, the other factor that contributes to the figure of merit F. However, in the invention, the loss of gain that would accompany increasing the stiffness of the disk 16 is minimized by the composite disk structure that incorporates the peripheral ring-like mass 32. By combining the central, low mass honeycomb structure 31 with the dense peripheral ring 32, the radius of gyration, and, thus, the amplitude of vibration (and, therefore, the gain) of the disk 16 is increased beyond that possible in an accelerometer of conventional solid composition throughout.

An analysis of the operation of an accelerometer in accordance with the invention has confirmed the expected improvement in figure of merit, F of a device in accordance with the invention over an accelerometer having a disk of solid character. In a parameter study in which different design parameters were varied to determine their effects upon resonant frequency, scale factor, figure of merit F, etc., finite element models were constructed and run. In a first case, the outermost element row defining the free disk was set at a relatively "heavy" value (density of 0.461 lb per cubic inch). In a second case, the mass was moved inboard (reduced radius of gyration) with the total flex disk mass (4.70 grams) maintained. AS predicted, the resonant frequency and scale factor (in dB) varied inversely; however, the figure of merit F increased when the mass was concentrated on the outer edge, representing an increase in radius of gyration. Thus, analysis confirms that, by concentrating mass at the exterior of the disk 16, through the combination of an interior honeycomb structure and a solid exterior ring structure, a device with enhanced figure of merit is obtained.

As can be seen, the invention provides an accelerometer possessing a higher figure of merit than a corresponding accelerometer in accordance with the prior art employing a solid disk. Aluminum honeycomb, the material of the central structure 31, is made in a wide variety of dimensions (cell size, total thickness and skin thickness can be varied independently), permitting the designer a wide range of options. The inherent very high stiffness-to-mass ratios of honeycomb materials allow the sensitivity and bandwidth of the sensor to be treated nearly independently within a particular design. This is due to the fact that the stiffness is dominated by the honeycomb structure dimensions (in which the stiffness can be changed with little weight penalty) and the solid peripheral ring 32 dominates the structural mass while having almost no effect on stiffness.

While this invention has been described with reference to its presently preferred embodiment, it is not limited thereto. Rather, the invention is limited only insofar as it is defined by the following set of patent claims and includes within its scope all equivalents thereof.

What is claimed is:

1. An accelerometer comprising:

a) a disk having opposed surfaces;

b) a said disk being substantially-horizontally supported within a case;

c) a first coil of optical fiber being fixed to the top surface of said disk and a second coil being fixed to the bottom surface of said disk;

d) a substantially-planar honeycomb structure intermediate said top and bottom surfaces of said disk; and e) a solid ring fixed to the periphery of said disk.

2. An accelerometer as defined in claim 1 wherein said ring comprises tungsten.

3. An accelerometer as defined in claim 1 wherein:

a) said case comprises a base and a cover;

b) said base includes a central post; and c) said disk has a central aperture for receiving said post.

4. An accelerometer as defined in claim 3 wherein said cover forms a watertight seal with said base.

5. An accelerometer comprising:

a) a substantially-planar disk including a circular periphery;

b) said disk being horizontally-supported within a case;

c) first and second coils of optical fiber fixed to opposed surfaces of said disk;

d) said first and second coils forming the legs of an interferometer;

e) said disk including a central portion comprising a substantially-planar disk and an outer portion comprising a peripheral ring;

f) said disk is a honeycomb structure; and g) said peripheral ring being characterized by greater density than said disk.

6. An accelerometer as defined in claim 5 wherein said disk comprises aluminum.

7. An accelerometer as defined in claim 5 wherein:
a) said case comprises a base and a cover;
b) said base includes a central post; and
c) said disk has a central aperture for receiving said post.

8. An accelerometer as defined in claim 7 wherein said cover forms a watertight seal with said base.

9. An accelerometer as defined in claim 6 wherein said ring comprises tungsten.

10. A method for increasing the figure of merit of an accelerometer including a centrally-mounted, substantially horizontal disk having opposed top and bottom surfaces within a case comprising the steps of:
   a) interposing a honeycomb structure between said top and bottom surfaces of said disk; and
   b) arranging a solid ring-like mass about the periphery of said disk.

11. A method as defined in claim 10 additionally comprising the step of interposing a honeycomb structure of aluminum composition.

* * * * *